(No Model.) 2 Sheets—Sheet 1.

J. T. PERKINS.
PIPE COUPLING.

No. 600,444. Patented Mar. 8, 1898.

Witnesses
J. A. Doophy
Victor J. Evans

Inventor
James T. Perkins.
By John Wedderburn
Attorney (No Model.) 2 Sheets—Sheet 2.

J. T. PERKINS.
PIPE COUPLING.

No. 600,444. Patented Mar. 8, 1898.

Witnesses
J. A. Brophy
Victor J. Evans

Inventor
James T. Perkins.
by John Wedderburn
Attorney

UNITED STATES PATENT OFFICE.

JAMES TREANOR PERKINS, OF UNION CITY, TENNESSEE, ASSIGNOR OF TWO-THIRDS TO WILLIAM J. EDWARDS AND JOHN A. PERKINS, OF SAME PLACE.

PIPE-COUPLING.

SPECIFICATION forming part of Letters Patent No. 600,444, dated March 8, 1898.

Application filed June 26, 1897. Serial No. 642,475. (No model.)

*To all whom it may concern:*

Be it known that I, JAMES TREANOR PERKINS, of Union City, in the county of Obion and State of Tennessee, have invented certain new and useful Improvements in Automatic Dust-Valves for Coupling-Heads; and I do hereby declare the following to be a full, clear, and exact description of the invention, such as will enable others skilled in the art to which it appertains to make and use the same.

The object of this invention is to provide an improved automatic valve or closer for the end section of the hose to which a train-pipe is coupled together between the cars to preclude any dust, dirt, or other foreign matter from entering the end of said section of the train-pipe, thereby gaining access to the triple valve or other mechanism of the air-brake system.

Figure 1:
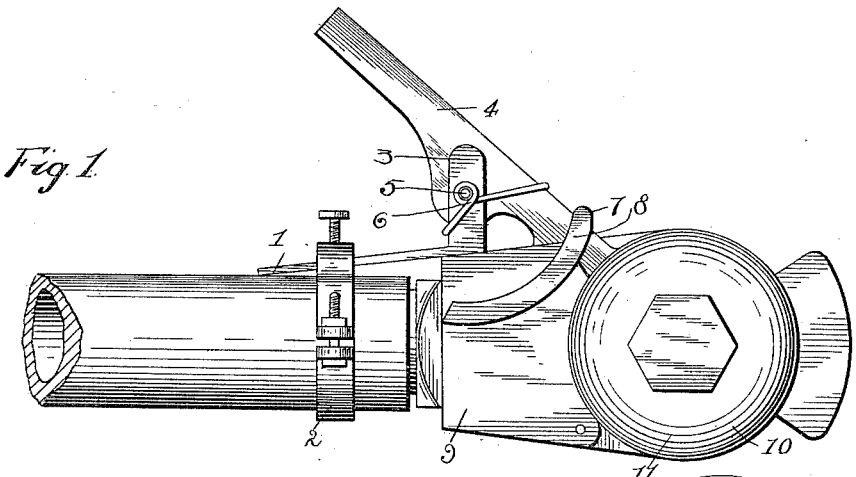
Figure 2:
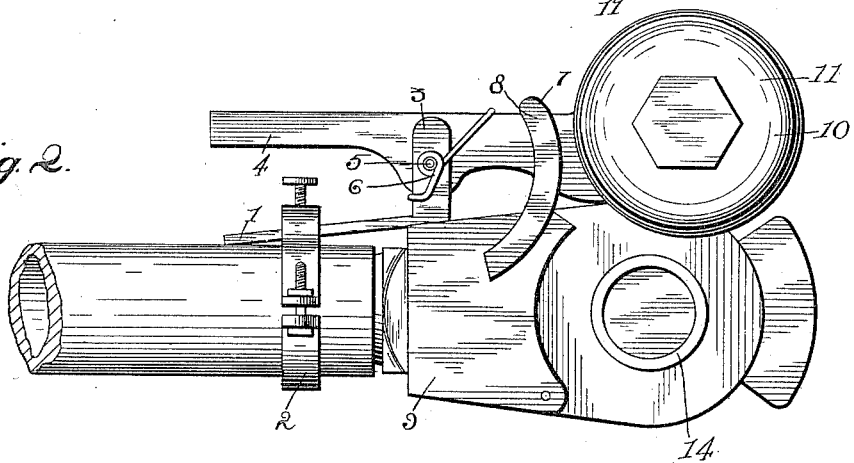
Figure 3:
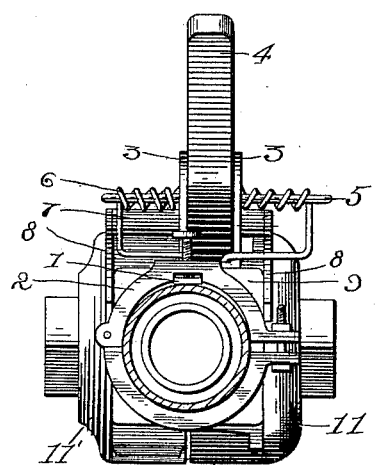
Figure 4:
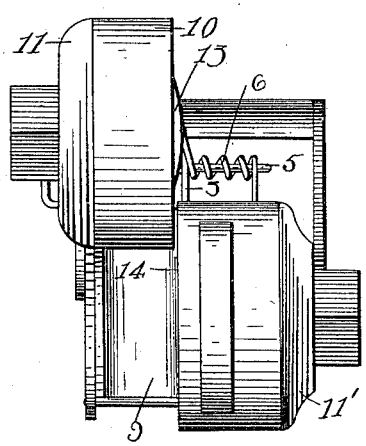
Figure 5:
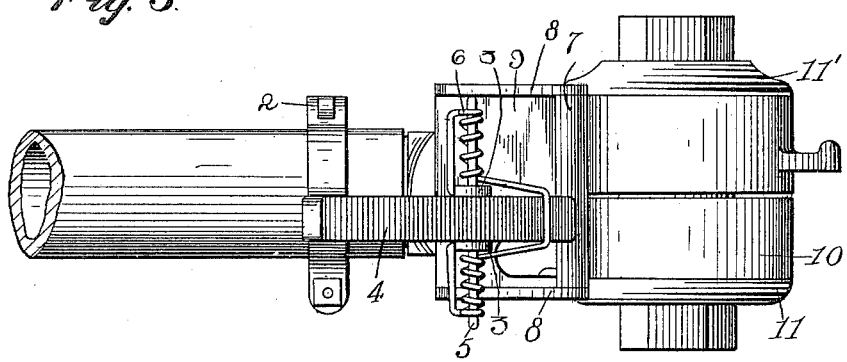
Figure 6:
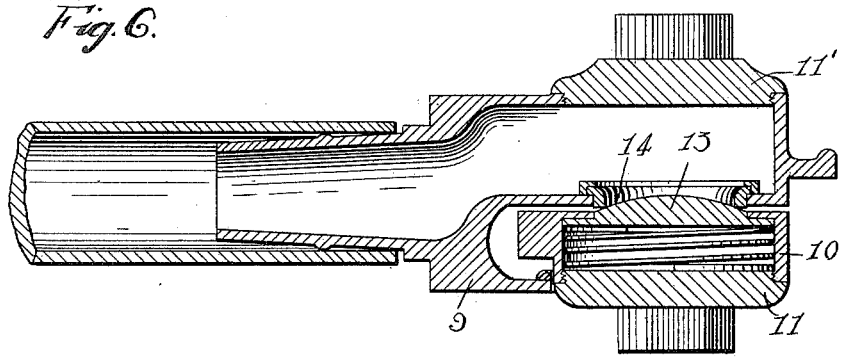

In the drawings herewith, forming a part of this specification, Figure 1 is a side elevation of my improved device in a closed position. Fig. 2 is a similar view showing the device in an open position. Fig. 3 is a rear elevation. Fig. 4 is a front elevation, the closer being raised. Fig. 5 is a top plan view. Fig. 6 is a cross-sectional view on the line $x\,x$ of Fig. 5.

In the construction of my improved automatic closer I provide, first, an arm 1, which projects outwardly in a horizontal plane from the end of one of the pipe-sections, being secured rigidly by having its inner end portion clamped between the hose and the clamping-ring 2 and resting within a slot in the inner surface of said clamping-ring, so as to prevent any lateral movement. Formed upon the inner end of said arm I provide a vertical yoke 3. Within said vertical yoke 3 I pivot an arm or handle 4 by means of a transverse pin 5, passed through apertures in said yoke and through the handle 4, and I also provide a suitable spiral or other spring 6, having its bearing upon the surface of said handle 4 in such a manner as to maintain the same in an elevated position. The said handle 4 is maintained against lateral oscillation by means of a transverse bar 7, secured upon the upper surface of said handle, each end of said bar 7 being provided with a downwardly and rearwardly inclined sector-arm 8, the said arms bearing slidably against the lateral surfaces of the projected coupling-head 9. Upon the outer end of the said handle 4 is formed an annular closing-head 10, said closing-head being centrally recessed and provided exteriorly with a screw-threaded cap 11 and provided interiorly with an outwardly-projected spring-boss 12, projected by means of a spiral or other suitable spring 13.

In the adjoining surface of the coupling-head 9 I provide surrounding the aperture leading thereinto a gasket 14 of rubber or other suitable material, the outer surface of said gasket being nearly flush with the surface of the coupling-head and held within the aperture leading thereinto in any suitable manner. The opposite surface of the coupling-head is provided with a screw-threaded cap 11'; but this portion of the head may be simply recessed without the screw-cap therefor.

The operation of my improved coupling-head closer is as follows: When the sections of a hose are desired to be coupled together, the handle 4 is depressed, raising the opposite end portion 10 away from the coupling-head 9, after which the coupling is made as ordinarily, and the closing-head 10 will rest upon the attached coupling-head. When the detachment is effected, the closing-head 10 will automatically fall into a closing position. As the closing-head descends the spring-impelled boss 12 will be pushed back into the closing-head until it registers with the gasket 14, when it will spring against the said gasket, effectually closing the detached coupling-head.

I may change the form of the handle 4 so as to make it more adaptable to the hand and less inclined in its position, and I may also provide a recess upon the inner side of the boss, so that the spring may rest in said recess, and I may also provide a casing over the spring 6, so as to protect it from snow and ice. I may also adopt other means for securing the horizontal arm 1, to which is pivoted the handle 4. My invention, however, is essentially an automatic spring-closing device for the open end of a coupling-head with means for securely maintaining said closer in position after uncoupling.

Having thus described my invention, its construction and uses, what I claim as new, and desire to secure by Letters Patent, is—

1. The combination with the coupling-head upon one of the end sections of a hose, of a spring-impelled closing-head, a pivoted arm supporting said closing-head and holding it in connection with the coupling-head, and a transverse bar for limiting the lateral oscillation of said arm, substantially as described.

2. The combination with the coupling-head upon the end of a section of hose of a self-acting closing-head, means for pivoting the closing-head upon the coupling-head, a spring-impelled boss mounted within a recess in said closing-head, a gasket secured within the opposite coupling-head in such manner as to receive the said boss when the closing is effected, a handle for raising said closing-head out of its closed position and lateral guides for preventing the oscillation of said closing-head.

3. A device for closing the coupling-heads of detached hose-sections, consisting of a closing-head pivoted upon a coupling-head, a handle for raising said closing-head, means for preventing the lateral oscillation of the same, spring for impelling downwardly the said closing-head, a boss secured within said closing-head, a spring for impelling said boss outwardly therefrom, a gasket secured in the coupling-head adapted to register with the said boss when the closing-head is in a depressed position, and means for securing the said closing-head upon the coupling-head, the whole constructed, arranged and adapted for operation, substantially as herein set forth.

In testimony whereof I have signed this specification in the presence of two subscribing witnesses.

JAMES TREANOR PERKINS.

Witnesses:
   J. M. RIPPY,
   D. M. PEARCE.